United States Patent [19]

Albuschkat

[11] Patent Number: 4,700,565
[45] Date of Patent: Oct. 20, 1987

[54] DEVICE FOR ARTIFICIALLY PRODUCING AIR FLOW

[75] Inventor: Dieter Albuschkat, Gutersloh, Fed. Rep. of Germany

[73] Assignee: Rodenhurst Limited, Douglas, Isle of Man

[21] Appl. No.: 766,877

[22] Filed: Aug. 16, 1985

[30] Foreign Application Priority Data

Jan. 10, 1985 [DE] Fed. Rep. of Germany ....... 8424283

[51] Int. Cl.[4] ............................................. G01M 9/00
[52] U.S. Cl. .......................................... 73/147; 272/2
[58] Field of Search .................. 73/147; 272/2, 6, 16, 272/17, 18, 24

[56] References Cited

U.S. PATENT DOCUMENTS 3,484,953 12/1969 Norheim, Jr. ............................ 272/2
4,457,509 7/1984 St-Germain .............................. 272/2

FOREIGN PATENT DOCUMENTS 0813722 6/1937 France .................................... 272/6

Primary Examiner—Donald O. Woodiel
Attorney, Agent, or Firm—Collard, Roe & Galgano

[57] ABSTRACT

For artificially producing air flow for the purpose of causing people to float in the air stream so produced, a device in the form of a supporting skeleton is provided, which is adapted to be dismantled and transported and designed for set-up on a flat base, said device having a wind duct with a unit for accelerating the air and an associated air flow straightener arranged therein. The floating space is limited by nets for protecting the people floating therein. One net is arranged above the flow straightener and another net is disposed above the device. The net serving as the top limitation is arched upwardly by the flow of air produced, for which purpose it has a central insert which is impermeable or nearly impermeable to air. For spectators, a stand is arranged extending around the supporting skeleton, serving at the same time as an access way for people entering the floating space.

17 Claims, 3 Drawing Figures

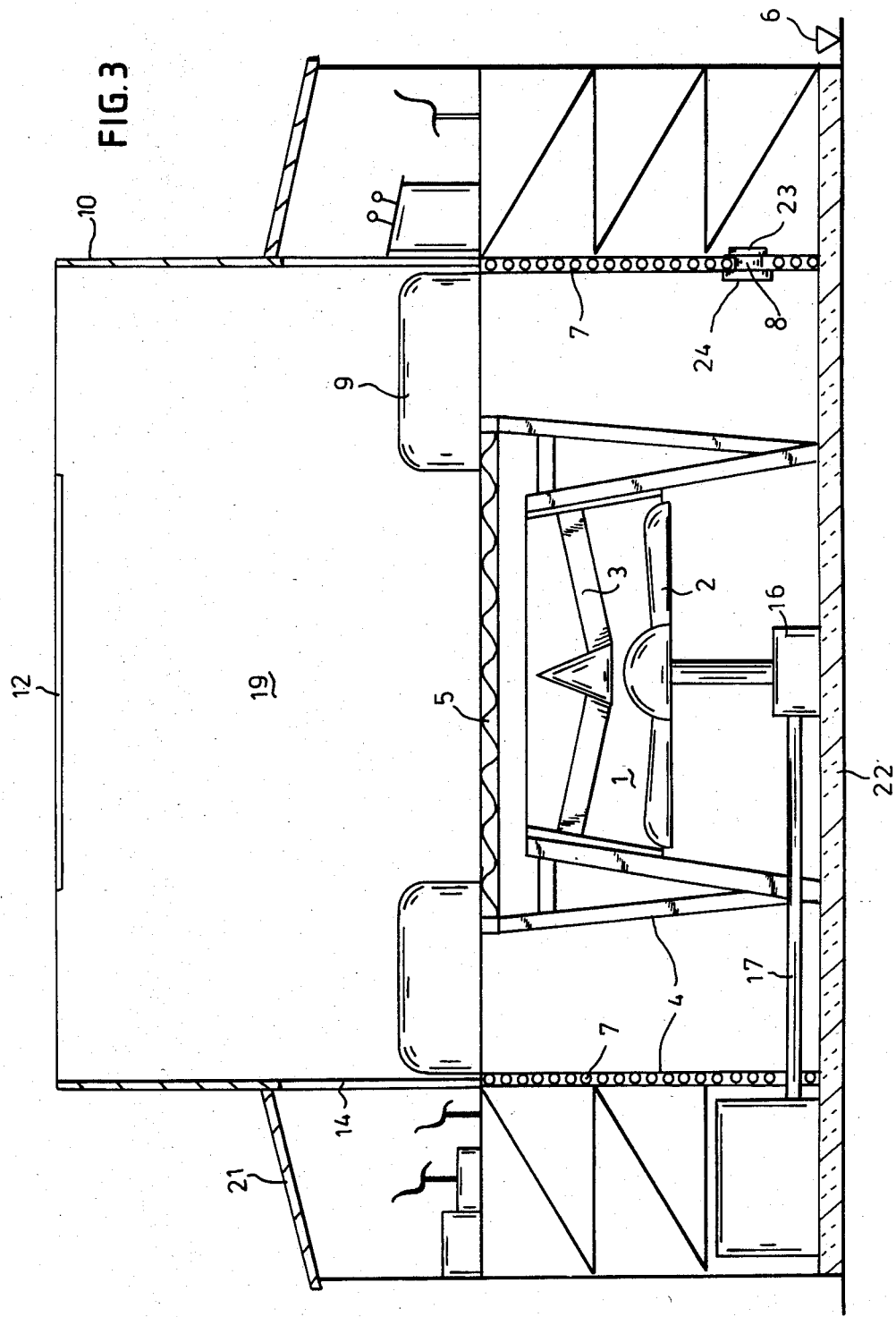

DEVICE FOR ARTIFICIALLY PRODUCING AIR FLOW

The present invention relates to a device or system for artificially producing air flow for causing people to float in the air stream so produced.

It is well known to produce an artificially generated air flow for the purpose of causing people to float in the air stream so produced within a stationary installation, with the flow of air being circulated in an enclosed structure. Owing to the fact that the flow of air is circulated, such an installation requires a large structure and a relatively great expenditure in terms of investment and upkeep. It has been found to be particularly disadvantageous that the circulating air in such a system requires cooling by means of special equipment.

It is an object of the present invention to provide a device of the type described above, which permits the production of an artificial flow of air for the purpose of floating people in the air stream at much less cost and reduced expenditure in terms of material and space requirements. In particular, the present invention permits the omission of cooling of the air.

This object is accomplished according to the present invention by a structure having a supporting skeleton capable of being dismantled and transported and designed for set-up on a flat base, and a unit, particularly a propeller, arranged in a wind duct for accelerating the air together with an associated flow straightener. Preferably, the wind duct is designed in the form of a cylinder or truncated cone.

Another feature of the invention is that a horizontally stretched net is disposed above the flow straightener and the outer periphery of the supporting skeleton is extended upwardly beyond the level of the net, where the upwardly extended outer periphery of the supporting skeleton is partially or wholly enclosed by a limiting net. Said enclosed space serves as the floating space which, for safety reasons, is closed at the top by a roof limiting net. Preferably, the roof limiting net has a central layer or insert which is impermeable to air or nearly impermeable to air. The flow of air produced by the propeller is thrust upon this insert from the bottom, causing an upward arching of the roof limiting net. In order to have a sufficient spatial volume available for people floating, it has been found that it is preferable if the ratio between the length of the part of the supporting skeleton extending beyond the level of the net and the length of the supporting skeleton extending below the net is about 1:1 to 1:0.5.

For sound insulation, the supporting skeleton may be covered by a sound deadening wall extending from the flat base up to the level of the horizontally stretched net, the wall having one or several sound-insulated air inlet openings disposed at a level below the propeller. These air inlet openings are provided with a grate or net in order to prevent foreign matter from penetrating the openings. The supporting skeleton of the device may be arranged circularly or polygonally, and the entire surface may be covered by a sound-insulating layer.

In a preferred embodiment of the invention, an elastic layer designed in the form of an annular disk is arranged at the level of the horizontally stretched net, extending therearound. This layer is preferably open to the air duct to thus form an air cushion layer which may be divided into individual independent sectors. The design selected for the supporting skeleton permits arranging in a simple manner a stand for spectators around the supporting skeleton, which, at the same time, may serve as an access for the people entering the flow of air, as well as for arranging a control and switching cabin thereon. The function intended for the stand suggests that the stand should start at approximately the level of the horizontally stretched net.

The device according to the present invention can be set up and dismantled in a simple manner in any desired location and assures the safe floating of people without any hazards while being watched by spectators. The set-up and dismantling and the upkeep are extremely economical mainly due to the fact that cooling of the air as hitherto required is omitted.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIG. 3 is a view similar to FIG. 1 showing another embodiment of the present invention.

Figure 1:
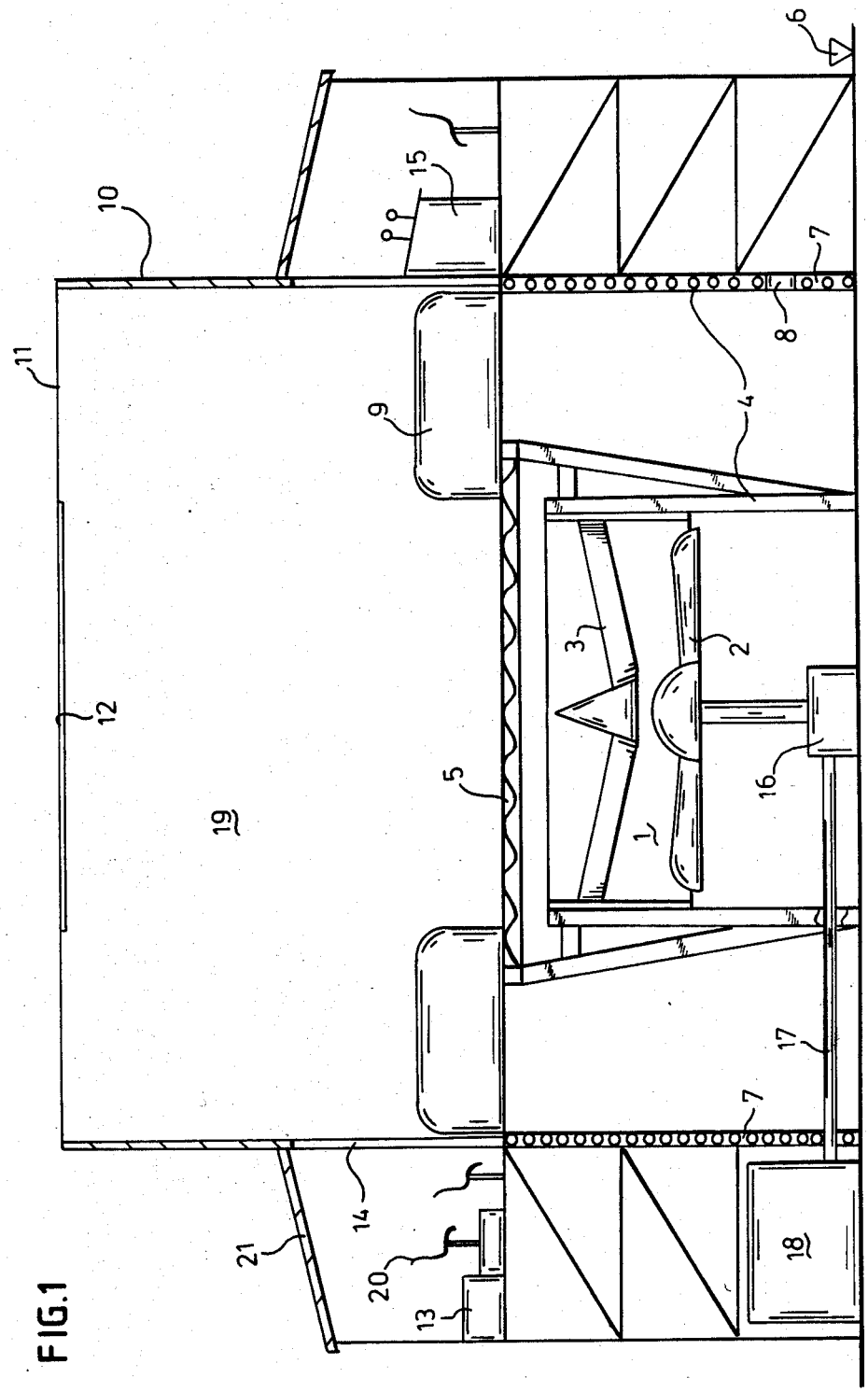
FIG. 1 is a vertical cross-sectional view of the system according to the present invention.
Figure 2:
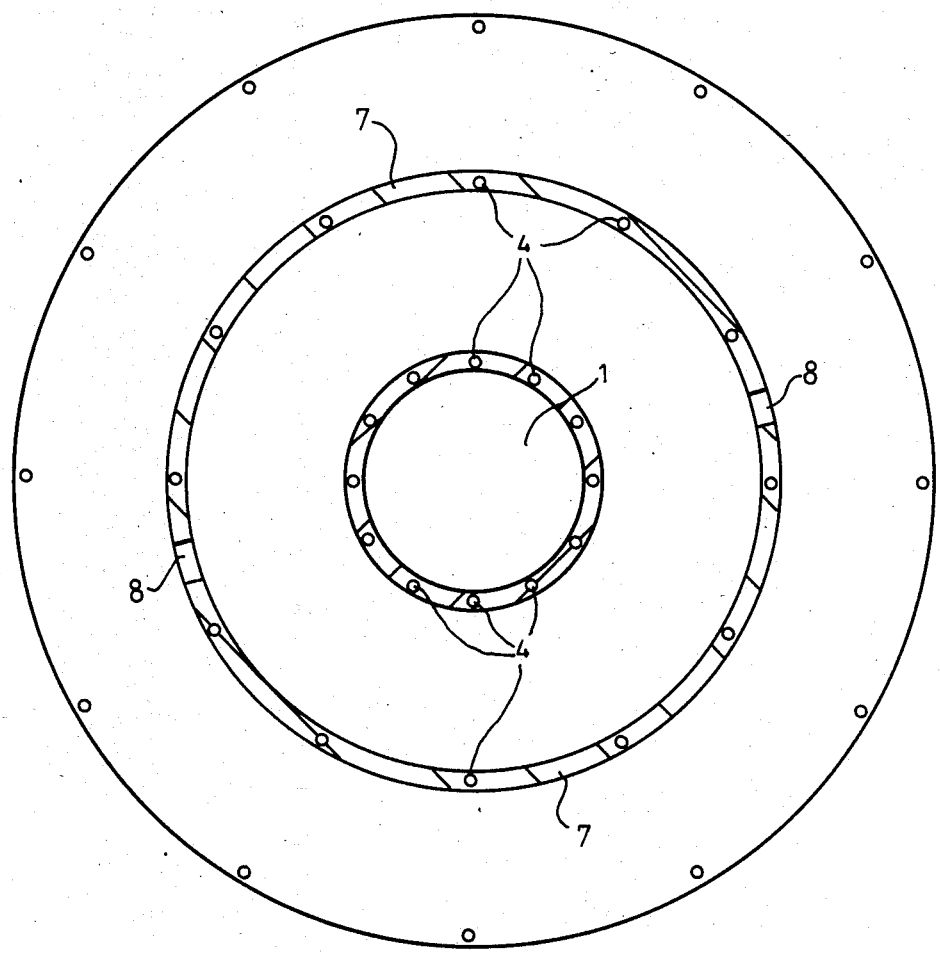
FIG. 2 is a horizontal cross-sectional view of the system of FIG. 1.

The device or system according to the present invention has a supporting skeleton 4 adapted to be dismantled and transported and designed for set-up on a flat base 6. FIG. 2 clearly shows that the vertical supports of skeleton 4 are arranged in a circular pattern. In the center, a cylindrical wind duct 1 is provided and a propeller 2 is arranged in the duct for producing the air flow. Propeller 2 is connected to a drive 18 by means of gearing 16 and a Cardan shaft 17. A flow straightener 3 is arranged in wind duct 1 above propeller 2. Wind duct 1 is closed at the top by a horizontally stretched net 5, which may be made of steel wire or plastic material. Net 5 prevents the people floating in the flow of air from the danger of floating downwardly into wind duct 1.

In order to reduce the noise generated by the running of propeller 2, supporting skeleton 4 is covered by a sound deadening wall 7 extending from flat base 6 up to the level of the horizontally stretched net 5. This wall is provided with several sound-insulated (see FIG. 3) air inlet openings 8 arranged therein disposed at a level below propeller 2 and protected from the outside by a grating or the like.

An air cushion layer 9 formed by an elastic layer open to wind duct 1 is arranged outside of the zone of wind duct 1 and is in the form of an annular disk extending therearound at the level of horizontally stretched net 5. Air cushion layer 9 may be divided into several independent sectors around wind duct 1. The outer periphery of supporting skeleton 4 extends upwardly beyond the level of net 5 and supports a peripheral limiting net 10. The extension of supporting skeleton 4 is larger than the supporting skeleton beneath horizontally stretched net 5. A roof limiting net 11 is arranged as the upper closure of floating space 19 and is provided with a center insert 12 which is impermeable or nearly impermeable to air. Insert 12, which is impermeable to air and the flow of air produced by the propeller, causes roof limiting net 11 to be slightly upwardly arched.

The device may be provided with a stand 13 extending around the device. Stand 13 may be equipped with seats 20 for spectators as well as with a control and switching cabin 15 for operating the device. Furthermore, stand 13 serves as an access way to floating space 19. For insuring the safety of both the spectators and people floating in floating space 19, stand 13 is separated from floating space 19 by a transparent covering made of plexiglass. The roof of stand 13 is identified by reference numeral 21.

As clearly seen in FIG. 3, wind duct 1 may be in the form of a truncated cone and a sound insulation layer 22 may be provided beneath the device so that the entire surface of the device is covered by sound insulation. Also, air inlet openings 8 may be provided at the inlet side with a grate or grid 23 and at the outlet side with sound insulation 24.

While only a single embodiment of the present invention has been shown and described, it will be obvious that many changes and modifications may be made thereunto without departing from the spirit and scope of the invention.

What is claimed is:

1. A device for artificially producing air flow for causing the flotation of persons in the airstream so produced, said device comprising a supporting skeleton adapted to be dismantled and transported and designed for setup on a planar base, a unit arranged in a wind duct for accelerating air together with an associated flow straightener, a horizontally stretched net arranged above said flow straightener, a sound-deadening wall covering said supporting skeleton and extending from said planar base up to the level of said horizontally stretched net, and a sound insulating layer covering the entire surface of said device.

2. The device as defined in claim 1, wherein the wind duct is in the form of a cylinder.

3. The device as defined in claim 1, wherein the wind duct is in the form of a truncated cone.

4. The device as defined in claim 1, wherein at least one air inlet opening is arranged in said sound deadening wall.

5. The device as defined in claim 4, wherein said at least one air inlet opening is disposed at a level lower than the air accelerating unit.

6. The device as defined in claim 5, wherein said at least one air inlet opening is sound-insulated and covered by a grate.

7. The device as defined in claim 1, wherein said supporting skeleton is circular in shape.

8. The device as defined in claim 1, wherein said unit for accelerating the air is arranged in a sound-insulated space.

9. The device as defined in claim 1, wherein said unit for accelerating the air includes a propeller.

10. A device for artificially producing air flow for causing the flotation of persons in the airstream so produced, said device comprising a supporting skeleton adapted to be dismantled and transported and designed for setup on a planar base, a unit arranged in a wind duct for accelerating air together with an associated flow straightener, a horizontally stretched net arranged above said flow straightener, and an elastic layer arranged at the level of said horizontally stretched net extending around said net and having the shape of an annular disk.

11. The device as defined in claim 10, wherein said elastic layer is formed by an air cushion layer.

12. The device as defined in claim 11, wherein said air cushion layer is divided into individual independent sectors.

13. A device for artificially producing air flow for causing the flotation of persons in the airstream so produced, said device comprising a supporting skeleton adapted to be dismantled and transported and designed for setup on a planar base, a unit arranged in a wind duct for accelerating air together with an associated flow straightener, a horizontally stretched net arranged above said flow straightener, the outer periphery of said supporting skeleton being extended upwardly beyond the horizontally stretched net wherein the ratio between the length of the part of the supporting skeleton extending upwardly beyond the net and the length of the supporting skeleton beneath the net is about 1:1 to 1:0.5, and a roof limiting net arranged as the top closure of said device having a central insert which is at least nearly impermeable to air.

14. The device as defined in claim 13, wherein the upwardly extended outer periphery of the supporting skeleton is enclosed by a limiting net.

15. The device as defined in claim 13, wherein a stand is arranged outside of the supporting skeleton extending all around approximately at the level of the horizontally stretched net.

16. The device as defined in claim 15, wherein said stand is partially provided with a transparent covering, said covering being impermeable to air.

17. The device as defined in claim 16, wherein a control and switching cabin is arranged on said stand.

* * * * *